United States Patent [19]
Schmitt et al.

[11] 3,839,121
[45] Oct. 1, 1974

[54] METHOD OF BONDING USING MELT ADHESIVES BASED ON POLYAMIDES

[75] Inventors: Karl Schmitt, Herne; Fritz Gude, Wanne-Eickel; Siegfried Brandt, Herne, all of Germany

[73] Assignee: Veba-Chemie AG., Gelsenkirchen-Buer, Germany

[22] Filed: Mar. 31, 1972

[21] Appl. No.: 240,280

Related U.S. Application Data

[63] Continuation of Ser. No. 60,707, Aug. 3, 1970, abandoned.

[30] Foreign Application Priority Data

Aug. 5, 1969  Germany............................ 1939758

[52] U.S. Cl.................. 156/331, 161/88, 161/227, 260/78 A
[51] Int. Cl. ..... C09j 5/00, C08g 20/04, B32b 27/34
[58] Field of Search..................... 156/331; 260/78 A

[56] References Cited
UNITED STATES PATENTS

| | | | |
|---|---|---|---|
| 2,252,555 | 8/1941 | Carothers | 260/78 |
| 2,293,388 | 8/1942 | Hanford | 260/78 |
| 2,293,760 | 8/1942 | Peters | 260/78 X |
| 2,442,958 | 6/1948 | Morris et al. | 260/78 |
| 3,352,942 | 11/1967 | Schmitt et al. | 260/78 X |
| 3,642,572 | 2/1972 | Endres et al. | 162/164 |
| 3,784,495 | 1/1974 | Sprauer | 260/18 N |

FOREIGN PATENTS OR APPLICATIONS 1,132,039  10/1968  Great Britain ....................... 260/78

*Primary Examiner*—Douglas J. Drummond
*Assistant Examiner*—Robert A. Dawson
*Attorney, Agent, or Firm*—Burgess, Dinklage & Sprung

[57]  ABSTRACT

Method of adhesively securing two substances together which comprises disposing between said substances melt adhesive composition comprising:

a. 10–90 mol percent of the product of the copolymerization of an aliphatic, open-chained and/or cyclic dicarboxylic acid with 4–12 C-atoms and a cyclic diamine or a mixture of an aliphatic, open-chained and a cyclic diamine with 2–15 C-atoms, wherein at least half of the diamine component thereof is branched by alkyl groups bonded to carbon atoms in the main chain or in the ring with b. 90–10 mol percent of a ω-amino acid component or precursor thereof with 4–12 C-atoms, heating said adhesive composition and applying pressure to at least one of said substances.

13 Claims, No Drawings

METHOD OF BONDING USING MELT ADHESIVES BASED ON POLYAMIDES

CROSS-REFERENCE TO RELATED APPLICATION

This application is a continuation of copending application Ser. No. 60,707 filed Aug. 3, 1970, now abandoned.

The invention relates to the application of co-polyamides of certain composition as melt adhesives.

Generally it is to be expected, that a melting adhesive does not change its properties, especially its melting conditions, i.e., its thermal strength. But if a melting adhesive contains hydrophilic groups, it will swell under storage in water or under moisture. In polyamides having a melting temperature below 180°C, the absorption of water leads to a high reduction of its thermal strength and the adherent parts decompose by the reaction with water, especially hot water.

Melt adhesives based on polyamides, which should be resistant against water, especially hot water, therefore have a very low content of CONH-groups, which are responsible for the absorption of water. These melt adhesives are formed by the reaction of dicarboxylic acids having long chains, for example dimerised fatty acids or amino acids having long chains, for example $\omega$-aminolauric acid or the lactam of it. The relatively low content or CONH-groups in these polyamides does not admit a high absorption of water.

But in many cases a high absorption of water is wanted. This is especially true for certain melt adhesives, which are applicated for the coalescing of textiles, because the balance of moisture between skin and air should not be impaired. This characteristic is also necessary for luted parts of wood for retaining the breath activity. Therefore the invention is concerned with such adhesives on the basis of polyamides, having a high absorption of water.

Co-polyamides having a high part of unbranched structure units with respect to amines and acids are partially crystalline and their melting temperatures are far above 200°C. These high melting temperatures are generally not wished in the application as melt adhesives. If on the other side the amount of the unbranched structure units is too low, the melting temperature is lowered considerably. At the same time the stability against water, especially hot water, is lowered. For avoiding this disadvantages, dicarboxylic acids, diamines and amino acids with long chains must be used. But these polyamides only have a low ability for the absorption of moisture.

It was found, that special polyamides, based on branched diamines, are very suitable as melt adhesives with respect to the demand of high water absorption, and at the same time highly resistant against hot water, although the melting temperatures are below 160°C. Polyamides of such kind are characterized by the following combinations:

1. 10–90 mol percent are members of aliphatic, open-chained and/or cyclic dicarboxylic acids with 4–12 C-atoms and the equivalent members of aliphatic, open-chained and/or cyclic diamines with 2–15 C-atoms, wherein at least half of the diamine, members is branched by alkyl groups bound to C-atoms of the main chain or the ring.

2. 90–10 mol percent are radicals of $\omega$-amino acids with 4–12 C-atoms. For getting melt adhesives with melting temperatures below 150°C and a resistance against wash lyes having a temperature of 80°C, at least half of the diamine members according to component 1 of the polyamide should contain at least 2 alkyl groups bound to the C-atoms of the main chain or the ring.

The melting temperature may still be lowered, if open-chained diamines are combined with cyclic diamines. It is astonishing, that in this case the resistance against water is not reduced. Especially it is favourable to use open-chained diamines with at least 3 alkyl groups bound to the C-atoms of the main chain and cyclic diamines with at least 3 alkyl groups, bound to the C-atoms of the cyclus according to component 1 of the combination. With these compounds melting temperatures below 150°C and resistance against boiling water lye are attainable.

An absorption of moisture of up to 12 percent is attainable with melting adhesives of the following composition:

1. 10–40 mol percent are members of dicarboxylic acids containing 4–12 C-atoms and the equivalent members of diamines with 2–15 C-atoms, wherein at least half of the diamine members contain at least 3 alkyl groups bound to a C-atom in the main chain or in the cyclus.

2. 0–40 mol percent are radicals of $\omega$-amino capronic acids and 25–28 mol percent are members of $\omega$-amino carboxylic acids with 7–12 C-atoms.

These melting adhesives may be worked up down to a temperature of 110°C, although they have a relatively high melting temperature, because they have a broad melting range.

A very high water absorption up to about 15 percent is attainable with melt adhesives of the following composition:

1. 10–40 mol percent of components of a dicarboxylic acid containing 4–12 C-atoms and a diamine component, wherein 20–80 percent of the diamine component is open-chained and contains for at least half of said components; 3 alkyl groups bound to the C-atoms of the main chain and 80–20 mol percent of the diamine component is alicyclic and contains for at least half of said components 3 alkyl groups bound to the ring.

2. 90–60 mol percent are radicals of $\omega$-amino capronic acid. These special interesting melt adhesives have melting temperatures down to 110°C and they are resistant against wash lye up to 80°C, although they have a high water absorption. In case of high amounts of esters of the amino capronic acid in the range of 85–70 mol percent they ever are resistant against boiling wash lye. The radicals of the following dicarboxylic acids may be contained in the melt adhesives according to the invention: Open-chained and cyclic, branched and unbranched aliphatic dicarbonic acids with 4–12 C-atoms, for example succinic acid, adipic acid, 2,2,4-trimethyl adipic acid, azelaic acid, dodecandiacid, cyclohexane-1,4-dicarboxylic acid. The radicals of following diamines may be contained in the melt adhesives according to the invention: Up to 50 mol percent of the diamines may be aliphatic or isocyclic unbranched diamines with 2–12 C-atoms, for example ethylenediamine, hexamethylenediamine, dodecamethylenediamine and 50–100 mol percent of the diamine may be branched diamines with 3–15 C-atoms, for example 1,2 propylene diamine, 3-methylhexamethylene diamine, 3,3-dimethylhexamethylene diamine, 2,4,4- and 2,2,4-trimethylhexamethylene diamine, 3,6 diamino-2-methylcyclohexane, 1-amino-3-aminomethyl-3,5,5-trimethylcyclohexane, 4,4-bisaminomethyl-2,2'-dimethyldicyclohexylmethane.

Radicals of the following ω -amino acids may be contained in the melt adhesives according to the invention: ω -amino acids with 4–12 C-atoms, for example ω -aminobutene acid, ω -aminocapronic acid, ω -aminoundecane acid, ω -aminolauric acid.

The addition of further polyamide formers is possible for attaining special properties. For example the addition of low amounts of aromatic dicarboxylic acids or diamines raise the melting temperature, if wanted. The average molecular weights of the polyamides used according to the invention as melt adhesives, are between 2000 and 40.000. For textile uses polyamides having average molecular weights between 6,000 and 25.000 are preferred.

The polyamides, used according to the invention, are easy to produce according to known processes, for example by melting condensation. The molecular weights are adjusted in known manner by the application of an excess of the diamine or dicarboxylic acid or by the addition of monofunctional amines or carboxylic acids during condensation.

The molpercent given are related to the CONH- groups, that means the sum consists of 0,5 mol dicarboxylic acid radicals and 0,5 mol diamine radicals is 1 mol.

The melting temperatures are defined with a microscope having a heating device. By the given temperature the test examples begin to stick upon the base.

Example 1

A co-polyamide consisting of
1,05 mol adipic acid
0,70 mol 1-amino-3-aminomethyl-3,5,5-trimethylcyclohexane
0,30 mol 2,2,4-trimethylhexamethylene diamine
6,00 mol caprolactam is produced by melting condensation at temperatures of 200°–230°C. The average molecular weight is about 15,000.

The melting temperature is at 130°C. The co-polyamide absorbs about 12 percent of water in the maximum.

The product is breaked up to a grain size of 0,1–0,44 mm in a blowing mill. For testing the adhesive strength, the powder is spread in a thin uniform layer to a piece of linen textile in the size of 4 × 10 cm, and covered from a piece of linen textile in the size of 4 × 10 cm, and covered with a piece of linen textile of the same size. By a short-time pressing with a flat iron at 130°C both linen textile layers were luted. The testing example was stirred and heated for half an hour in water having a temperature of 95°–100°C and containing 0,4 % of a usual detergent. No reduction of the adhesion was found. Also stirring in trichlorethylene at 60°C for half an hour was without influence to the adhesive strength.

Example 2

A co-polyamide consisting of
1,04 mol azelaic acid
0,30 mol 1,3-bisaminomethylcyclohexane
0,40 mol 3,3-dimethylhexamethylene diamine
5,20 mol caprolactam
is produced by melting condensation at 200°–230°C. The average molecular weight is about 12.000 The melting temperature is 140°C, the water absorption 11 percent. A foil made from this material and having a thickness of 0.2 mm, was laid between 2 thin plates of wood and this combination was pressed in a vapour-heated press under a pressure of 10 kg/cm². Later the luted parts of wood were stored for 10 hours in water having a temperature of 60°C. The luted parts do not solve.

Example 3

In replacing 1,3-bisaminocyclohexane by hexamethylene diamine in example 2, a polyamide is formed, whose melting and working up temperature is raised for 10°. Also the resistance against heat is increased for 10°.

Example 4

A co-polyamide consisting of
1,08 mol adipic acid
0,60 mol 2,4,4-trimethylhexamethylene diamine
0,40 mol 1-amino-3aminomethyl-3,5,5-cyclohexane 7,00 mol caprolactam
is formed by melting condensation at 200°–300°C. The average molecular weight is about 10.000. The melting temperature is 130°C, the absorption of water in the maximum 12 percent. The co-polyamides may be used as lining for cloth. The luted parts do not solve in boiling washlye.

Example 5

A co-polyamide consisting of
1,06 mol adipic acid
0,60 mol 1-amino-3-aminomethyl-3,5,5-trimethylcyclohexane
0,20 mol dodecanmethylene diamine
0,20 mol 2,4,4-trimethylhexamethylene diamine
2,00 mol caprolactam
4,00 mol ω -aminoundecanic acid
is produced by melting condensation at 200°–230°C. The average molecular weight is about 17.000. The melting temperature is 140°C, the absorption of water in the maximum 8 percent. The co-polymerizate is solved in ethanol and sprayed over a non-woven material consisting of cellulose fibre. After a short pressing at together 130°C, a solid non-woven stuff is obtained, which does not lose its strength by washing with wash lye at 80°C.

Example 6

A co-polyamide consisting of
0,70 mol adipic acid
0,30 mol azelaic acid
1,08 mol 1-amino-3aminomethyl-3,5,5-trimethylcyclohexane
5,00 mol ω -aminoundecanic acid
is produced by melting condensation of 200°–230°C. The average molecular weight is about 14.000. The melting temperature is 150°C, the absorption of water in the maximum 12 percent. Staple fibres, produced from this polyamide, were added to nylon 6,6 in an amount of 5 percent for the production of non-wovens.

By pressing at 120°C, the non-woven material was solidified. By washing in water lye of 100°C, no decrease in the strength was to observe.

What is claimed is:

1. A method of adhesively securing two substances together which comprises disposing between said substances a melt adhesive composition comprising:
    a. 10–90 molpercent of the product of the co-polymerization of an aliphatic, open-chained and/or cyclic dicarboxylic acid with 4–12 C-atoms and a cyclic diamine or a mixture of an aliphatic, open-chained and a cyclic diamine with 2–15 C-atoms, wherein at least half of the diamine component thereof is branched by alkyl groups bonded to carbon atoms in the main chain or in the ring with
    b. 90–10 molpercent of a ω-amino acid component or precursor thereof with 4–12 C-atoms, heating said adhesive composition and applying pressure to at least one of said substances.

2. A method according to claim 1 wherein in the resultant co-polyamide at least half of the diamine components contain at least two alkyl groups bonded to the carbon atoms in the main chain or ring.

3. A method according to claim 1 wherein the resultant co-polyamide at least half of the diamine components contain at least 3 alkyl groups bonded to the carbon atoms in the main chain or in the ring.

4. A method according to claim 1 wherein the resultant co-polyamide contains open-chained and cyclic diamine components in the molar ratio of 80:20 to 20:80.

5. A method according to claim 1 wherein the resultant co-polyamide contains 10–40 molpercent of a component of an aliphatic, open-chained and/or cyclic dicarboxylic acid with 4–12 carbon atoms and an equivalent number of components of a cyclic diamine or a mixture of an aliphatic, open-chained and a cyclic diamine with 2–15 carbon atoms, wherein at least half of the diamine component is branched and 0–40 molpercent thereof is a ω-aminocaproic acid and 20–80 molpercent thereof is a ω-amino acid with 7–12 carbon atoms.

6. A method according to claim 1 wherein the resultant co-polyamide contains 10–40 molpercent of a component of an aliphatic, open-chained and/or cyclic dicarboxylic acid with 4–12 carbon atoms, the equivalent rest being of a cyclic diamine or a mixture of an aliphatic, open-chained and a cyclic diamine with 2–15 carbon atoms, wherein at least half of the diamine component is branched and 90–60 molpercent of a component of a ω-aminocaproic acid.

7. A method according to claim 1 wherein at least one of the substances secured togethe is linen.

8. A method according to claim 1 wherein both of the substances secured together are linen and the adhesive is heated to a temperature above its melting point.

9. A method according to claim 8 wherein the adhesive has a melting point below 200°C.

10. A method according to claim 1 wherein the co-polyamide is the reaction product of acelaic acid, 1,3-bis-amino-methylcyclohexamine 3,3-dimethylhexamethylene diamine and caprolactam.

11. A method according to claim 1 wherein the co-polyamide is the reaction product of adipic acid, 2,4,4-trimethylhexamethylene diamine, 1-amino-3-aminomethyl-3,5,5-cyclohexane and caprolactam.

12. A method according to claim 1 wherein the co-polyamide is the reaction product of adipic acid, 1-amino-3-aminomethyl-3,5,5-trimethylcyclohexane, dodecanmethylene diamine, 2,4,4-trimethylhexamethylene diamine, caprolactam and ω-amino-undeconoic acid.

13. A method according to claim 1 wherein the co-polyamide is formed by the condensation of adipic acid, acelaic acid, 1-amino-3-aminomethyl-3,5,5-trimethylcyclohexane, and ω-amino-undecanoic acid.

* * * * *